United States Patent [19]
Sweers

[11] Patent Number: 5,358,006
[45] Date of Patent: Oct. 25, 1994

[54] ADJUSTABLE DOWNSPOUT EXTENSION ASSEMBLY

[76] Inventor: Ronald L. Sweers, 6165 E. Atherton Rd., Burton, Mich. 48519

[21] Appl. No.: 42,159

[22] Filed: Apr. 2, 1993

[51] Int. Cl.⁵ .............................................. F16L 27/00
[52] U.S. Cl. ......................................... 137/615; 52/16; 405/119
[58] Field of Search ...................... 137/615; 52/16, 97; 193/16; 405/119

[56] References Cited

U.S. PATENT DOCUMENTS

| | | | |
|---|---|---|---|
| 1,031,829 | 7/1912 | Adams | 193/16 |
| 1,718,460 | 6/1929 | Hansen | 193/16 |
| 3,048,983 | 8/1962 | Crummel | 405/119 |
| 3,316,928 | 5/1967 | Weakley | 137/615 X |
| 3,375,851 | 4/1968 | Henry | 137/615 X |
| 3,861,419 | 1/1975 | Johnson | |
| 3,911,954 | 10/1975 | Johnson | |
| 4,552,260 | 11/1985 | Teagno et al. | |

*Primary Examiner*—Robert G. Nilson
*Attorney, Agent, or Firm*—Gifford, Groh, Sprinkle, Patmore and Anderson

[57] ABSTRACT

An adjustable extension assembly for a downspout includes a fixed piece attachable to the lowermost end of a downpipe, a rotatable collar attached to the fixed piece, and at least one extension pivotably attached to the rotatable collar. Optionally additional slidably extendable members may be telescopingly attached to the extension. The extension members are channel-shaped in cross-section. The extension may be composed of a polymerized material or a metal. In addition to being easily attached to a downspout, the adjustable extension of the present invention may be selectively adjusted for fitting, for selective water deflection, and for proper lawn maintenance.

22 Claims, 3 Drawing Sheets

ADJUSTABLE DOWNSPOUT EXTENSION ASSEMBLY

BACKGROUND OF THE INVENTION

I. Field of the Invention

The present invention relates to an extension assembly for rainwater downspouts. More particularly, the present invention relates to a multi-pieced, telescoping extension assembly that is attachable to the lowermost end of an existing downspout in place of the elbow. The extension is preferably composed of four pieces, including a fixed piece attached to the downspout, a rotatable collar rotatably attached to the fixed piece, a first extension telescopingly attached to tile rotatable collar, and a second extension telescopingly attached to the first extension. The extension assembly and the rotatable collar may be used separately or in combination.

II. Description of the Relevant Art

For centuries architects of all types of buildings have devised methods for collecting rainwater as it is deflected from the roof of a house and for directing the rainwater away from the rooftop in an orderly fashion. Early gutter systems were composed of slate, stone or wood.

Later improvements of gutters included the composition of gutters and downspouts from lead or copper. Both of these materials were found to be substantially water-resistant and malleable.

Construction of gutter system components from these materials was accomplished skillfully. In some instances, downspout openings were shaped to resemble animal heads whereby exhausting water flowed from the open mouths of the imitated creature. At other times gutter systems were fashioned to improve aesthetic appeal.

In more practical applications, modern day homes incorporate fiberglass, plastic or aluminum gutter and downspout systems. The downspout is fluidly interconnected with a gutter. The gutter itself is at a slight, but substantially unnoticeable incline in the direction toward the interattached downspout, thus preventing the water from collecting in a particular spot.

The most common problem with known gutter systems is that the elbow of the downspout, that part provided at the base of the downspout, only directs water slightly away from the house, perhaps to a length of eight inches. It is this small distance that allows water to be exhausted too close to the footings or basement of the house, thus causing foundation cracking and leaking. Evidence of collecting water may be seen as washed-out regions closely situated to the foundation. Another common problem with known gutter systems is that the elbow is fixed so that the water passing therethrough is directed only in one direction.

In partial response to these problems, downspout extensions of one-pieced construction are known. These are actually three to four foot lengths of straight downspout material that have been added to the elbow. While this known solution solves the immediate problem of water collected too close to the house by directing it a considerable distance away, this fixed, one-pieced extension creates another problem, which is that the extended downspout is a hazard. Not only does the extension make mowing the lawn difficult because the extension must first be removed before the area thereubeneath may be cut, but it also provides an object over which people, particularly inattentive children, may trip. Known extensions are also difficult to install because they typically have to be cut to fit as they are often provided in only one size. Additionally, as they are preferably easily removed for mowing, they are not well-secured.

In any event, the provision of an extension does not overcome the problem of the singular direction of water travel because of the fixed relation of the elbow and the downpipe. Even with an extension, water may undesirably collect in one spot, or that spot to which the water is directed.

Known approaches to providing downspout extension assemblies have failed to overcome the problems inherent in such assemblies.

Summary of the Present Invention

The present invention provides a downspout extension assembly which overcomes; problems inherent in presently-known extensions. The extension comprises a rotatable, multisectioned, telescoping extension assembly that is attachable to the lowermost end of the existing downspout. The extension of the present invention may be extended or retracted as may be desired for installation, adjustment, and for lawn mowing. It may also be rotated in one direction or the other to relocate water flow or for maintenance of the surrounding area.

The extension assembly of the present invention comprises two portions which may be used separately or may be used in combination. The first portion is the rotatable collar portion and the second portion the extension portion.

The first portion replaces the elbow of the downspout assembly and comprises a fixed collar adaptor that is attached to the lowermost end of the straight downspout. The fixed collar adaptor has a collar-receiving wall at its lowermost end. A rotatable collar is pivotably mounted to the collar-receiving wall of the fixed collar adaptor. Pivotably attached to the rotatable collar is a gutter extension.

The second portion is a telescoping gutter extension that may be used in combination with the first portion or may be attached directly to the elbow of the downspout assembly. The second portion comprises a first extension, one end of which is fixedly attached to the downspout elbow. Slidably attached to the first extension is a slidable extension. Additional slidable extensions may be telescopingly fitted to the first slidable extension so as to provide a length extendable to approximately nine feet from a retracted size of approximately three feet.

The first extension and the one or more slidable extensions each defines a U-shaped channel in cross-section. This open-topped construction allows for easy cleaning and free water flow.

Both portions of the adjustable downspout extension assembly of the present invention may be composed of a polymerized material such as fiberglass or plastic, or it may be composed of a metal such as aluminum.

According to the design of the present invention, the adjustable downspout extension assembly may be easily installed, easily adjusted to fit, readily retracted for lawn maintenance, and readily moved about to change water flow.

Other advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments when read in conjunction with the accompanying drawings, in which like reference characters refer to like parts throughout the views, and in which.

DETAILED DESCRIPTION OF THE PREFERRED

Embodiments of the Present Invention

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figure 1:
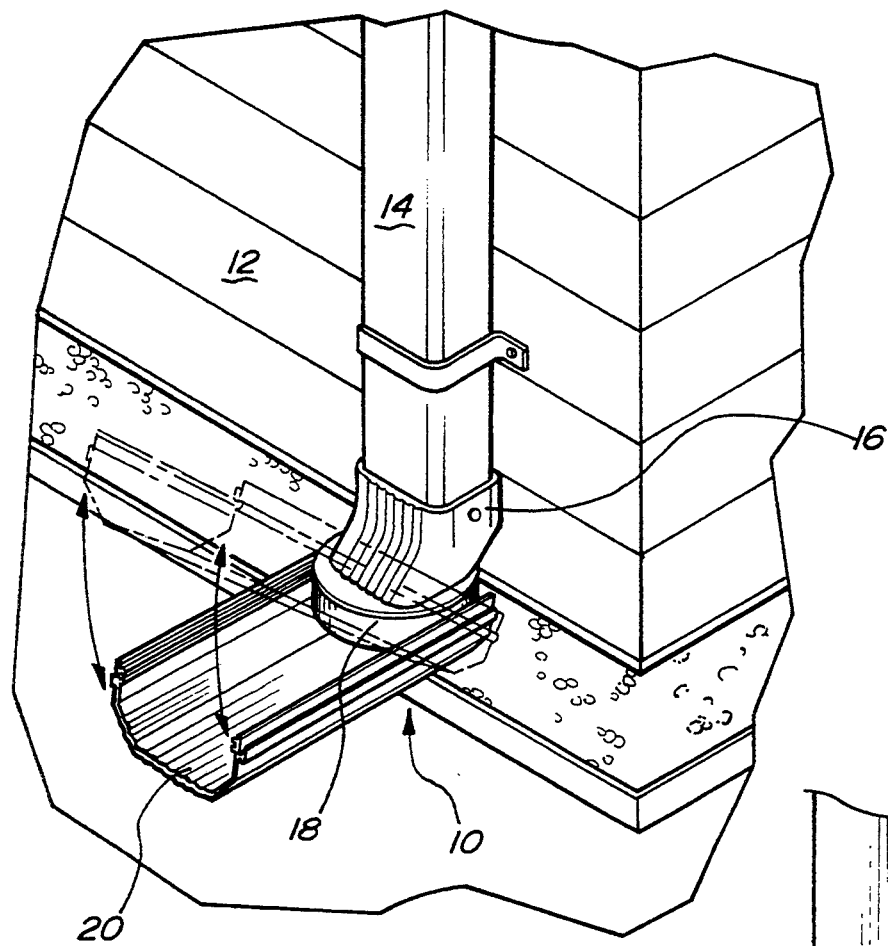
FIG. 1 is an environmental view of the first embodiment of the extension assembly of the present invention.

Referring to FIG. 1, a first embodiment of an adjustable downspout extension assembly according to the present invention is shown generally as 10. The assembly 10 is shown in its approximate environment near a house or similar structure, generally indicated as 12. Fitted to the side of the house 12 is a downspout 14. The assembly 10 is fitted to the lowermost end of the downspout 14 in place of the conventionally-provided downspout elbow (not shown). The assembly 10 comprises a fixed collar adaptor 16, a rotatable collar 18 (or female collar 18) a first rainwater, and extension 20. As illustrated by the shadow lines, the first rainwater extension 20 is pivotably mounted on the rotatable collar 18.

Figure 2:
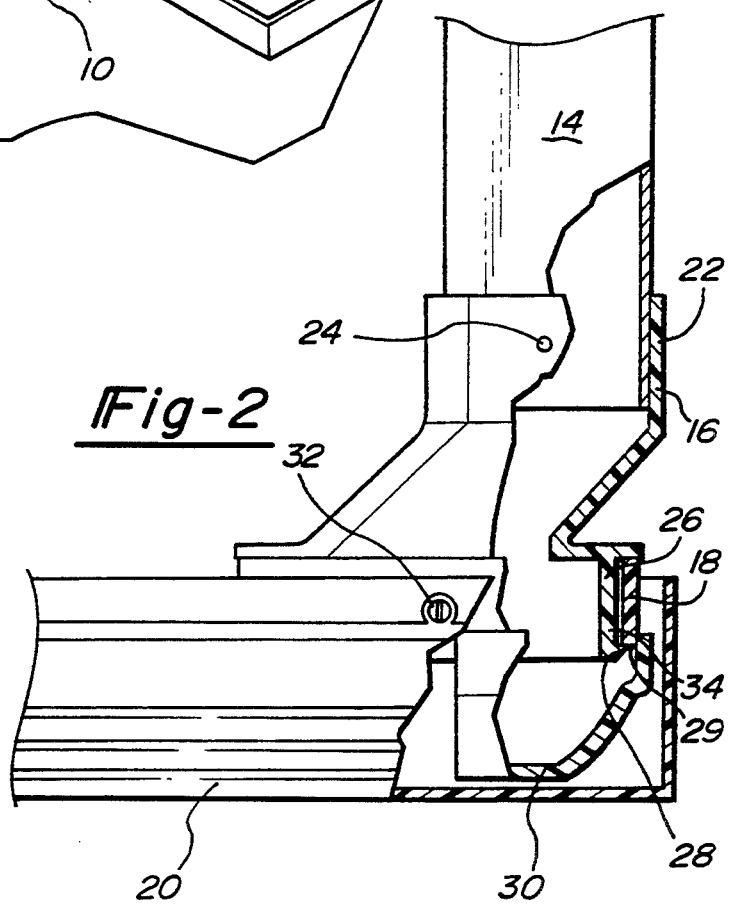
FIG. 2 is a side view of the first embodiment shown in partial cross-section.

With reference to FIG. 2, a side view of the assembly 10 is illustrated and is shown in partial cross-section. The uppermost part of the adaptor 16 includes a downspout receptacle 22 into which the lowermost end of the downspout 14 is inserted. The receptacle 22 and the end of the downspout 14 are fastened together with a fastener 24.

The lowermost end of the adaptor 16 has defined thereon a male attachment collar 26. Along the lowermost edges of the attachment collar 26 are provided one or more interlocking ledges 28 each fitted to a cantilevered tab 34. The ledges 28 of the tabs 34 fit beneath the lowermost portion of the rotatable collar 18 on an interlocking tab abutment surface 29, and thereby hold it in place in relation to the fixed collar adaptor 16. In this relation, however, the ledges 28 permit the collar 18 to rotate upon the fixed collar adaptor 16.

The lowermost portion of the rotatable collar 18 is open to allow the flow of water therethrough. A rain deflector 30 is fitted to the lowermost portion and covers about one half of the opening. The deflector 30 directs the rainwater into the first rainwater extension 20 and away from the structure 12. The first rainwater extension 20 is pivotably attached to the rotatable collar 18 by a fastener 32. As may be understood by reference to FIG. 2, one end of the first rainwater extension 20 extends well under the deflector 30 to assure that no back splashing of rainwater occurs.

Figure 3:
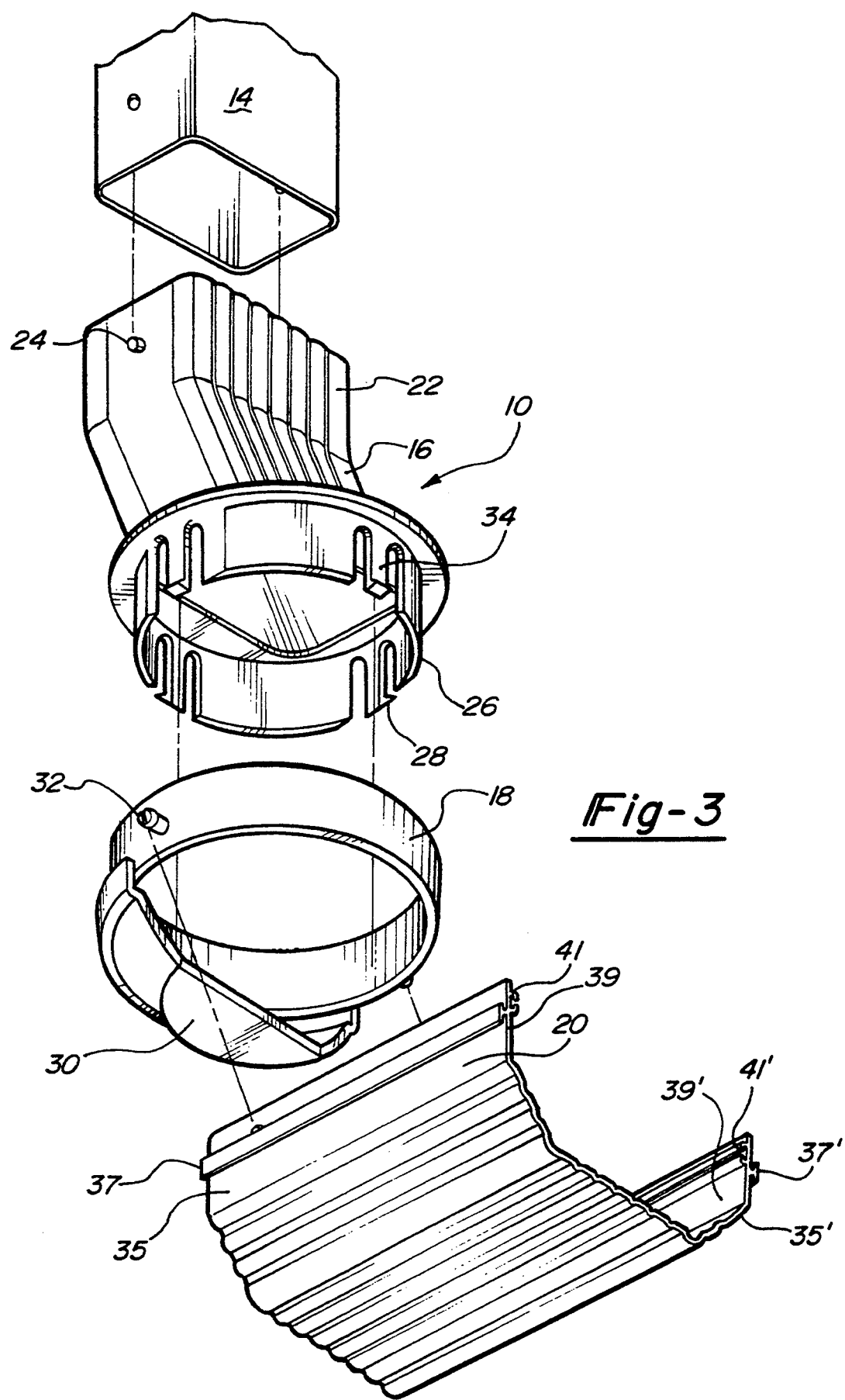
FIG. 3 is an exploded view of the first embodiment of the present invention.

Referring to FIG. 3, an exploded view of the assembly 10 is illustrated. This view better illustrates the construction of the male attachment collar 26. As illustrated the interlocking ledges 28 are disposed at the ends of the cantilevered tabs 34 of the male attachment collar 26. This construction permits the ledges 28 to be slightly depressed for attachment of the rotatable collar 18. Once the collar 18 is installed, the tabs 34 return to their substantially vertical positions and the ledges 28 lock beneath the rotatable collar 18 onto the interlocking tab abutment surface 29 to hold it in place against the fixed collar adaptor 16 while allowing the collar 18 to freely rotate thereupon.

FIG. 3 also illustrates the preferred construction of the rain deflector 30. As may be seen, one end of the extension 20 extends well below the rain deflector 30.

The components of the assembly 10 are preferably composed of a polymerized material such as a plastic, although they may be alternatively composed of a metal.

The first rainwater extension 20 is illustrated in FIGS. 1 through 3 as being a single piece. However, it may be desired that this extension be multiple-pieced and extendable. Accordingly, the second preferred embodiment of the present invention provides an extension system. The extension system shown in FIGS. 4 through 7 may be used separately or in conjunction with the embodiment of FIGS. 1 through 3.

The preferred method of interconnection of the extension channels of the present invention is also shown in FIG. 3. The first rainwater extension 20 is illustrated as having a right outer side 35 and a left outer side 35'. Fitted to the right outer side 35 is a T-shaped outer sliding member 37 and fitted to the left outer side 35' is a T-shaped outer sliding member 37'. The first rainwater extension 20 also includes a right inner side 39 and a left inner side 39'. Fitted to the right inner side 39 is an inner sliding member 41 and fitted to the right inner side 39' is an inner sliding member 41'. Both of the inner sliding members 41, 41' have T-shaped slots defined therein.

Although as mentioned above only one extension channel (the first rainwater extension channel 20) is illustrated it is understood that additional identical channels, such as a second rainwater extension (not shown), may be fitted to the first rainwater extension channel 20 as is illustrated below with respect to FIG. 7. Mating of one or more additional channels to the first rainwater extension channel 20 according to the embodiment shown in FIG. 3 is made possible by fitting an T-shaped outer sliding member into the T-shaped slot of the inner sliding member as may be understood by reference to the figure.

Figure 4:
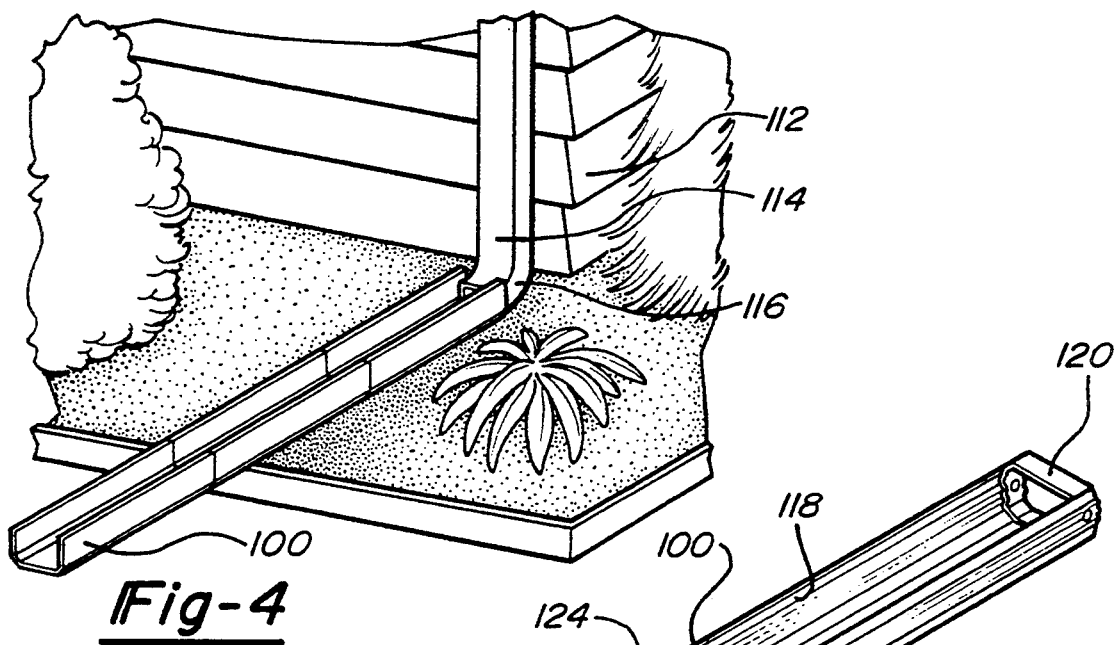
FIG. 4 is an environmental view of the second embodiment of the assembly of the present invention.

Referring to FIG. 4, an adjustable downspout extension according to the second embodiment of the present invention is shown generally as 100. The extension 100 is shown as in its approximate environment near a house or similar structure, generally indicated as 112. Fitted to the side of the house 112 is a downspout 114, having at its lowest end an elbow 116. (The fixed collar 16 and the rotatable collar 18 of FIGS. 1 through 3 may be used in lieu of the elbow 116.) As illustrated, the extension 100 receives rainwater from the downspout 114 as it passes from the elbow 116. The extension 100 finally receives the water and directs it well away from the house 112, thus preventing water from damaging the foundation of the house 112. As may be understood, the extension may be telescopingly adapted to meet a required or preferred length. In addition, the extension 100 may be telescopingly retracted to allow for lawn and garden maintenance.

Figures 5, 6:
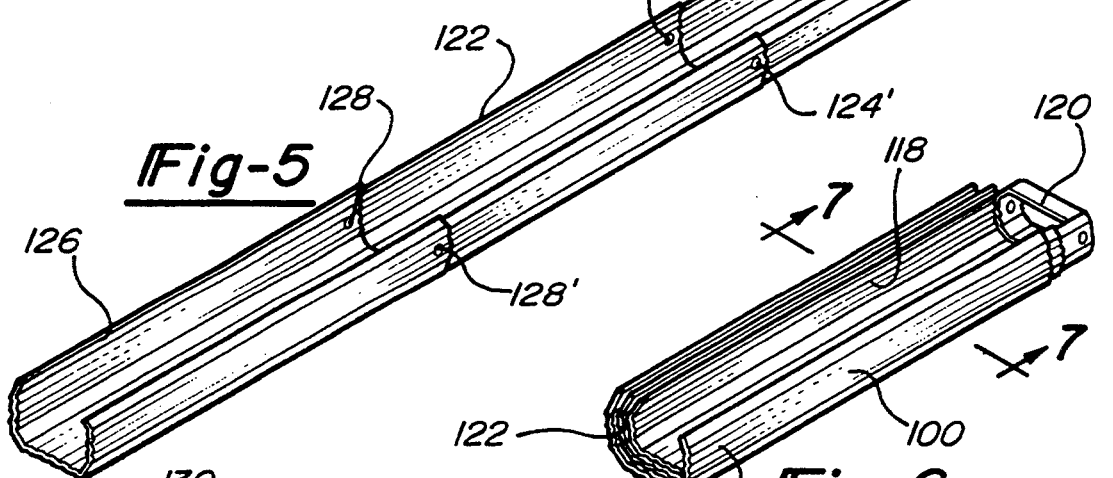
FIG. 5 is a perspective view of the second embodiment of the extension assembly of the present invention shown in isolation and in its fully extended position.
FIG. 6 is a view similar to that of FIG. 5 except showing the extension in its retracted position.

With reference to FIG. 5, the extension 100 is shown in isolation in its fully extended position. The extension 100 comprises a fixed member 118 that includes an attachment collar 120. The collar 120 is fixedly attached to the elbow 116.

A first telescoping member 122 is slidably fixed in relation to the fixed member 118. A pair of stops 124, 124' are provided on the first telescoping member 122 and stoppingly engage the fixed extension 118 when the first telescoping member 122 has reached its maximum extended limit.

As may be preferred, one or more additional telescoping members may be promoted to allow for additional extension. According to the preferred embodiment, a second telescoping member 126 is shown and is slidably attached to the first telescoping member 122. As with the first member 122, a pair of stops 128', 128" are provided on the second telescoping member 126 to stoppingly engage the first telescoping member 122 when the second telescoping member 126 has reached its maximum extended limit.

FIG. 6 is an illustration of the extension 100 in its retracted position. This illustration clearly indicates how the length of the extension 120 may be reduced to its minimal length for shipping, storage, and yard maintenance.

Figure 7:
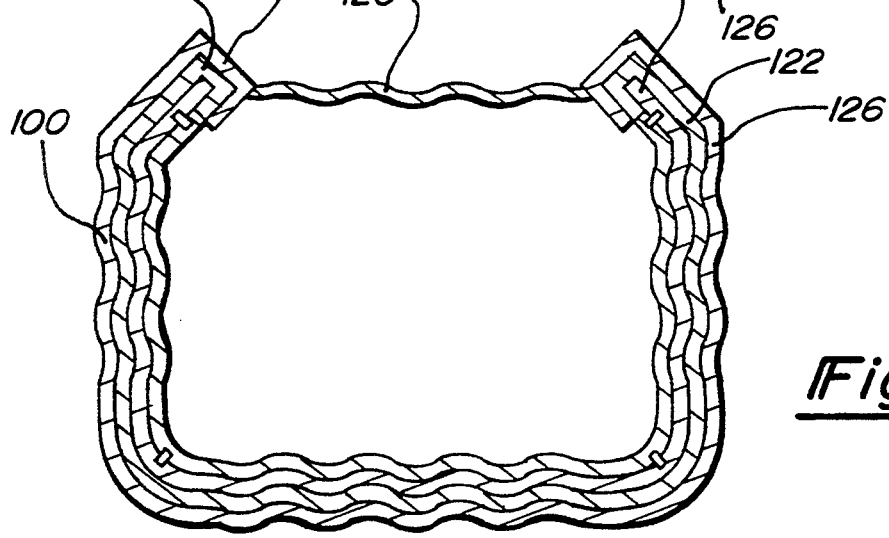
FIG. 7 is a sectional view taken along line 7—7 of FIG. 6 illustrating the layer portions of the second embodiment of the present invention.

Referring to FIG. 7, a cross-sectional view of the extension 100 is illustrated as shown along the line 7—7 of FIG. 6. This view illustrates the interattachment of the extension elements with each other. The first telescoping member 122 includes an overlapping flange 130 that overrides the upper edge of the fixed member 118 as the member 122 is extended. Similarly, the second telescoping member 126 includes an overlapping flange 132 that overrides the top side of the overlapping flange 130 of the first telescoping member 122.

Preferably, the collar adaptor 16, the rotatable collar 18, and the extension 100 may be composed of a polymerized material, such as a plastic or a vinyl. Alternatively, the extension 100 may be composed of a metal such as aluminum.

Having described my invention, however, many modifications thereto will become apparent to those skilled in the art to which it pertains without deviation from the spirit of the invention as defined by the scope of the appended claims.

I claim:

1. An assembly for attachment to the lowermost region of a rainwater downspout, said assembly comprising:
   an adaptor, said adaptor being fitted to said lowermost region of said downspout;
   a rotatable member rotatably attached to said adaptor;
   a first rainwater channel extension, said first rainwater channel extension being to said rotatable member;
   a second rainwater channel extension, said second rainwater channel extension being slidably attached to said first rainwater extension;
   each of said first and second rainwater channel extensions having a right outer side and a left outer side, each of said right and left outer Sides having an outer sliding member attached thereto;
   each of said first and second rainwater channel extensions having a right inner side and a left inner side, each of said right and left inner sides having an inner sliding member attached thereto;
   said outer sliding members of said second rainwater channel extension being slidably matable with said inner sliding members of said first rainwater channel extension; and
   said first rainwater extension and said second rainwater extension being interchangeable.

2. The assembly of claim 1 further including means for attaching said rotatable member to said adaptor.

3. The assembly of claim 2 wherein said means for attaching comprises a flange provided on said adaptor for interattachment with said rotatable member.

4. The assembly of claim 1 wherein said rotatable adaptor further includes a rainwater deflector shield.

5. The assembly of claim 1 further including a rainwater channel extension attached to said adaptor.

6. The assembly of claim 5 further including a first adjustable telescoping member attached to said rainwater channel extension.

7. The adjustable extension of claim 6 further including a second adjustable telescoping member attached to said first adjustable telescoping member.

8. The adjustable extension of claim 7 wherein said rainwater channel extension and said first adjustable telescoping member are U-shaped in cross-section.

9. The adjustable extension of claim 6 wherein said extension includes a pair of parallel top edges and said at least one telescoping member includes a pair of top edge flanges, said flanges having an upper side and a lower side, said lower side of said flanges slidably engaging said pair of top edges of said extension.

10. The adjustable extension of claim 6 further including means for stopping provided on said first, adjustable telescoping member.

11. The assembly of claim 1 wherein said assembly is composed of a polymerized material.

12. The assembly of claim 1 wherein said assembly is composed of a metal.

13. The downspout of claim 1 wherein said rotatable member has a first side, a second side, a lower end, said lower end having a front half and a back half, said rotatable member further including a rainwater deflector, said rainwater deflector being attached to said back half of said lower end of said rotatable member.

14. An assembly for attachment to the lowermost end of rainwater downspout, said assembly comprising:
   an adaptor for attachment to the lowermost end of a rainwater downspout;
   a rotatable collar rotatably attached to said adaptor, said rotatable collar having a first side, a second side, a lower end, said lower end having a front half and a back half;
   a rainwater deflector, said rainwater deflector being attached to said back half of said lower end of said rotatable collar; and a rainwater channel extension, said rainwater channel extension being attached to said first and second sides of said rotatable collar.

15. The assembly of claim 14 wherein said means for deflecting is an extension channel.

16. The assembly of claim 15 wherein said extension channel is pivotably attached to said rotatable collar.

17. The assembly of claim 16 wherein said extension has a first end and a second end.

18. The assembly of claim 17 further including a first telescoping member, said first telescoping member being slidably and adjustably attached to said first end of said extension.

19. The assembly of claim 14 wherein said adaptor includes a rotatable collar-holding wall, said wall including a ledge for rotatable attachment with said rotatable collar.

20. The assembly of claim 14 wherein said rainwater channel extension comprises a first and a second rainwater channel extension, said first rainwater channel extension being attached to said rotatable collar, said second rainwater channel extension being slidably attached to said first rainwater extension, each of said first and second rainwater channel extensions having a right outer side and a left outer side, each of said right and left outer sides having an outer sliding member attached thereto, each of said first and second rainwater channel extensions having a right inner side and a left inner side, each of said right and left inner sides having an inner sliding member attached thereto, said outer sliding members of said second rainwater channel extension being slidably matable with said inner sliding members of said first rainwater channel extension, and said first rainwater extension and said second rainwater extension being interchangeable.

21. A downspout assembly for attachment to the lowermost end of a rainwater downspout, said assembly comprising:

an adaptor, said adaptor having a top end and a bottom end, said top end being fixed to said lowermost end of said downspout;

a rotatable collar, said rotatable collar being attached to said bottom end of said adaptor and having a bottom end, said top end of said rotatable collar being rotatably a female attachment collar and a male attachment collar, said male attachment collar being pivotable within said female attachment collar, said male attachment collar including a cantilevered tab, said female attachment collar including a first end and a second end, said first end of said female attachment collar being disposed proximal to said male attachment collar and said second end of said female attachment collar being disposed distal to said male attachment collar, said second end of said female attachment collar having an interlocking tab abutment surface upon which said cantilevered tab slides, whereby said male attachment collar and said female attachment collar are kept pivotably interlocked; and means for directing rainwater, said means for directing being attached to said rotatable collar, said means for directing defining a channeled extension.

22. The assembly of claim 21 further including a telescoping extension telescopingly attached to said channeled extension.

* * * * *